358-190. OR 2,832,823 SR

SEARCH ROOM

April 29, 1958 R. N. RHODES 2,832,823

OVERLOAD PROTECTION CIRCUITS

Filed June 24, 1955

INVENTOR.
ROLAND N. RHODES
BY
ATTORNEY

United States Patent Office 2,832,823

Patented Apr. 29, 1958

2,832,823

OVERLOAD PROTECTION CIRCUITS

Roland N. Rhodes, Levittown, Pa., assignor to Radio Corporation of America, a corporation of Delaware Application June 24, 1955, Serial No. 517,734

3 Claims. (Cl. 178—7.5)

Figure 1:
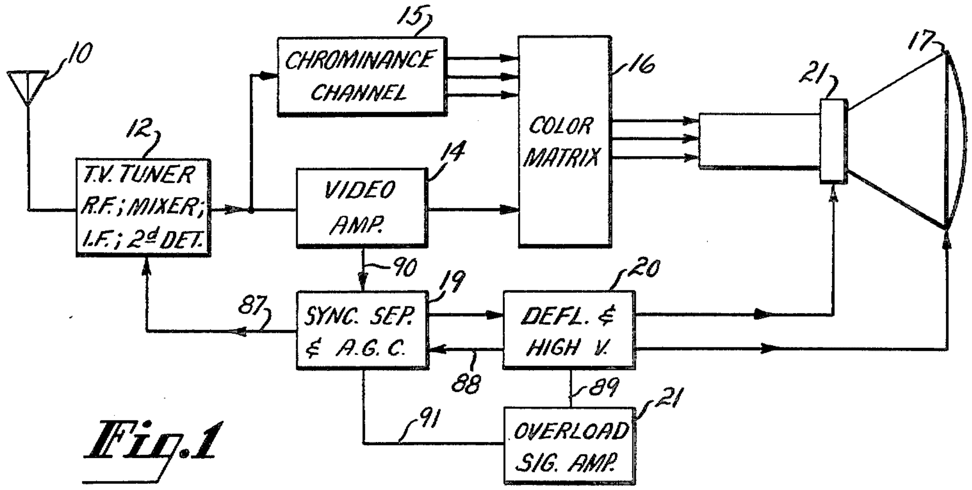

The present invention relates generally to overload protection circuits and particularly to circuits for preventing overload of the high voltage supply or kinescope in a color television signal receiving system.

In a television signal receiving system, in which the video or luminance signal handling circuits between the second detector and the image reproducing device are direct coupled, the direct current component of the detected luminance signal is applied to the video-signal amplifier control grid circuit along with the luminance signal variation components. The direct current component determines the average voltage in the anode circuit of the luminance signal amplifier as a direct function of the average brightness in the scene being televised.

This is an ideal operating condition except that on scenes of high average brightness, the kinescope ultor current may exceed the permissible maximum, or the high voltage power source may be overloaded resulting in image deterioration through misconvergence and defocusing. Reducing the settings of the contrast and/or brightness controls to avoid overload on high average brightness scenes results in the reproduction of scenes of normal or low average brightness at a highlight and brightness level greatly below a desirable level and below the average capability of the kinescope and high voltage power supply.

One method of avoiding this difficulty is the use of direct current degenerative networks which may be adapted to maintain variations in average ultor current below the point of overload for an all-white scene. This tends to avoid excessive ultor current on high-average-luminance signals without affecting the high-light to low-light brightness ratio, but has the disadvantage that the background brightness is increased on low-average-luminance signals. Moreover, such an increase may generally be accompanied by a shift in background color tone.

An object of the present invention is to provide an improved circuit for preventing overload of image reproducing devices and associated power sources.

It is a further object of the present invention to provide an improved circuit arrangement for preventing sustained overload of either an image reproducing device or the associated power supply without sacrificing brightness on scenes having high peak but low average brightness.

It is another object of the present invention to provide a kinescope and power supply protection circuit for preventing overload thereof without loss of the signal direct current component.

In accordance with the present invention, sustained overloading of the voltage source or excessive current in the image reproducing device is substantially prevented by reducing the gain of the receiving system during high average brightness scenes. This reduction in gain may be affected under the control of information indicating a deviation from a predetermined circuit condition. The predetermined circuit condition may reflect a condition in either a signal translating circuit or the image reproducing device.

Figure 2:
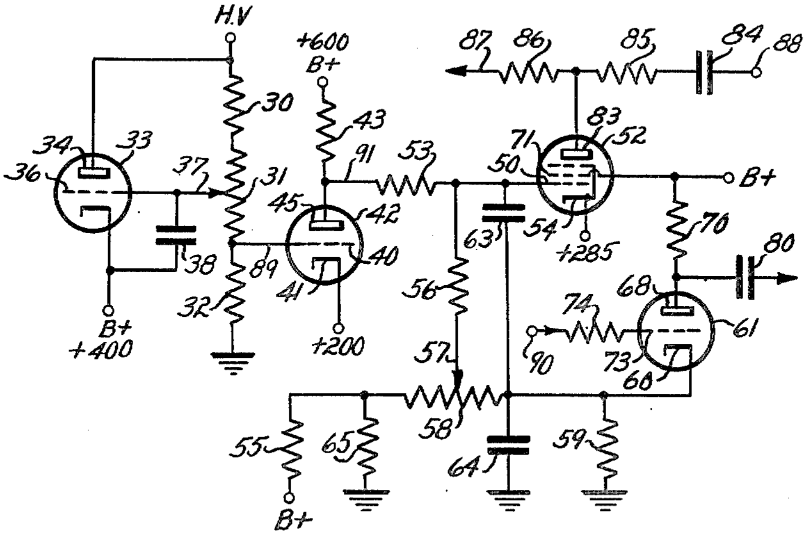

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 illustrates, by way of a block diagram, a color television signal receiving system embodying the present invention; and Figure 2 is a schematic circuit diagram of an overload protection circuit provided in accordance with the present invention.

Referring to the drawing, and particularly to Figure 1, there is shown a color television receiver of well-known form such, for example, as that described in "Practical Color Television for the Service Industry," published by RCA Service Company, Inc., Camden, New Jersey, second edition, April 1954. While the specific form of signal processing apparatus involved does not constitute a part of the invention, it may be noted that the receiver may be adapted to operate upon signals made up in accordance with standards set by the Federal Communications Commission on December 17, 1953.

In accordance with those standards, information regarding the luminance of a television scene is transmitted by amplitude-modulation of a main carrier wave with video signals proportional to the elemental brightness values of the scene, while the electrical information necessary for the reproduction of the several component colors in the scene is transmitted by a phase and amplitude-modulated subcarrier wave. The instantaneous phase of the subcarrier wave with respect to a reference phase is indicative of a selected hue and the instantaneous amplitude of the wave is proportional to the degree of saturation of the hue. In the interest of consideration not concerned with the present invention, the subcarrier wave is conventionally modulated with so-called color difference signals rather than the video signals representative directly of the composite color.

The antenna 10 in the apparatus of Figure 1 is adapted to intercept the above-described carrier wave information and to apply it to the input terminals of a television tuner section 12 which may be understood as including the usual radio-frequency, mixer, intermediate-frequency and second detector stages. The detected signal information is applied simultaneously to a video amplifier section 14 and to a chrominance channel 15.

It is, of course, to be understood that this is a simplified showing of the interaction of the various portions of a color television receiving system. As discussed, in the above identified reference, the video amplifier portion and chrominance channel of a color television signal receiving system must cooperate to provide synchronization in the chrominance channel in order to derive the color difference signals from the modulated color subcarrier wave and apply this information along with the amplified luminance information from a second video amplifier to the color matrix portion 16 of the system. The color matrix portion 16 is adapted to combine the information received from the chrominance channel 15 and from the video amplifier portion 14 in such a manner as to provide color signals which may be applied to an image reproducing device or kinescope 17 which may be of the type described in the article entitled "Three-gun video mask color kinescope," by H. B. Law, which appeared in the October 1951 issued of "Proceedings of the I. R. E."

Signal information which may or may not be of the same polarity as that applied to the color matrix 16 is derived from the video amplifier portion 14 and applied to the sync separator and AGC portion 19 of the receiving system in order to derive therefrom the synchronizing signals which are utilized to synchronize the deflection apparatus 20 of the receiving system with that of the transmitter. The deflection and high voltage portion 20 of the receiving system accordingly is connected to the kinescope accouterments including the deflection yokes 21 in order to provide a rectangular raster on the face of the kinescope 17. The high voltage which is also developed in the deflection and high voltage 20 is also applied to the kinescope 17 to provide electron beam acceleration.

The AGC system may be of the keyed variety in which case a flyback pulse is applied from the deflection and high voltage portion 20 to the sync separation and AGC portion 19 in order to establish an AGC level representative of the D.-C. level of the component video signal. The AGC signal thus derived is applied to one or more stages of the television tuner section 12 in order to control the gain of these stages as an inverse function of the amplitude of the received carrier wave. This inverse function may be conventionally represented on a graphical basis by a plot of AGC signal amplitude versus received signal intensity. For conventional AGC systems of the type upon which the present invention is based, this curve is logarithmic in nature, all portions of which have a value below a predetermined maximum slope. This maximum slope is therefore a direct indicia of the maximum gain of the AGC system itself.

Those portions of the television signal receiving system above discussed may be of conventional design and are adapted to receive and translate a color television signal in such a manner as to provide an image of the televised subject on the face of the kinescope 17. It has been found, however, that with conventional receiving systems, a high luminance condition may result in signal information being applied to the kinescope 17 which tends to result in an excessively high current condition in the kinescope.

As above noted, prior systems which have been devised to avoid excessively high current condition where such as to limit the kinescope operating conditions in such a manner as to prevent the full utilization of its capabilities.

In accordance with one aspect of the present invention, however, a sustained high current condition in the kinescope or overload of the high voltage supply is substantially prevented by deriving from the high voltage supply signal information indicative of either the high current condition or high voltage overload condition. This signal information is applied to an overload signal amplifier stage 21 to be amplified and applied to the automatic gain control circuit to effect a reduction in the gain of the signal translating portions of the receiving system thereby reducing the amplitude of the signal information ultimately applied to the image reproducing device.

A specific form of the invention which has been utilized to accomplish the above-mentioned functions is shown in Figure 2. It is, of course, to be understood that a correction signal may be derived from the high voltage supply of a color television signal translating system from any one of a large number of components within the high voltage supply circuit. The signal thus derived may be an A.-C. signal or may be a D.-C. signal. One such source of signal information indicative of an overload condition is a high voltage bleeder arrangement such as illustrated in Figure 2 wherein the resistors 30, 31 and 32 connected in series arrangement between the high voltage terminal of such a high voltage supply and signal ground represent the bleeder.

An electron discharge device 33 may be utilized as a voltage regulator tube in the high voltage supply and accordingly, comprises an anode 34 connected directly to the high voltage terminal and a cathode 35 connected to the positive terminal of an appropriate source of direct current voltage such as the low voltage supply of the television receiving system.

In order to provide adjustability of the regulated high voltage, the control electrode 36 of the regulator tube 33 is connected directly to a slider 37 on the resistor 31. The adjustment of the position of the slider 37 on the resistor 31 is such as to provide the correct bias condition between the control electrode 36 and the cathode 35 to establish the desired high voltage condition at the high voltage terminal. A by-pass capacitor 38 is connected directly between these two electrodes in order to reduce the effect of any alternating current signal which may be present between these points in the circuit.

An overload of the high voltage supply will result in a reduction in the voltage across the resistors 30, 31 and 32 or any one of them. Accordingly, the voltage which is developed across the resistor 32 is applied to the control electrode 40 of an electron discharge device 42 utilized as an overload signal amplifier stage. The cathode 41 is connected to the positive terminal of a source of direct current voltage having a magnitude slightly in excess of the static voltage existing across the resistor 32 such that the static bias condition between the control grid 40 and the cathode 41 provides an appropriate operating bias on the amplifier tube 42. A load impedance element illustrated as the resistor 43 is connected between the positive terminal of a further source of direct current voltage and the anode 45 of the amplifier tube 42.

Signals which may be derived from across the load resistor 43 are applied through a resistor 53 to the control electrode 50 of an electron discharge device 52 which may be utilized as the AGC amplifier tube. The cathode 54 of the AGC tube 52 is connected to the positive terminal of a further source of appropriate direct current potential to establish the static operating condition for the tube.

Further control and adjustment of the static bias condition applied between the control electrode 50 and the cathode 54 is provided by the resistive network comprising a resistor 56 connected between the control electrode 50 and a slider 57 of a potentiometer 58, a voltage divider comprising the series arrangement of the resistors 59 and 65 connected between the positive terminal of the source of direct current energizing potential and signal ground and a resistor 59 connected between one end of the potentiometer 58 and signal ground. The resistor 59 is also connected directly to the cathode 60 of an electron discharge device 61 utilized as a sync separator. Appropriate time constants and by-passing is provided by a pair of capacitors 63 and 64 which are connected respectively between the control electrode 50 and one end of the potentiometer 58 and the same end of the potentiometer 58 and signal ground.

The anode 68 of the sync separator tube 61 is connected through a load resistor 70 directly to the screen grid 71 of the AGC tube and to the positive terminal of a source of direct current operating potential such as the low voltage supply in the associated receiving system. Video signals from the video amplifier portion of the signal receiving system may be applied to the control electrode 73 through an isolating resistor 74 thereby providing a dynamic bias between the control grid 73 and the cathode 60 in accordance with the D.-C. level of the received signal information. Output signals in the nature of sync pulses may be derived from the anode 68 through a coupling capacitor 80 and applied to the deflection apparatus for synchronization thereof.

The keying of the AGC tube 52 may be provided by means of flyback pulses from the high voltage transformer which are applied to the anode 83 through a coupling capacitor 84 in series with a resistor 85. It may be seen, therefore, that the direct current potential available at the anode 83 is determined by the setting of the potentiometer 58, the D.-C. level of the received video signals and the overload condition of the high voltage supply to provide at the anode 83 an AGC bias in accordance therewith. This bias may be applied through an isolating resistor 86 and appropriate filter networks to the signal translating stages of the associated receiving system to control the gain thereof as an inverse function of the received signal information.

Each of the leads 87 through 91 interconnecting the individual stages have been correspondingly indicated in both figures in order to more clearly depict the relation of schematic circuit diagram of Figure 2 with the system of Figure 1.

If it is assumed that the signal translating system is operating in a normal manner, the high voltage supply will provide a substantially constant voltage for the associated kinescope and the voltage existing across the resistor 32 will also remain constant. However, upon the receipt of signal information which would tend to provide an excessive current condition in the associated kinescope, the loading or excessive current condition in the high voltage supply will result in a concomitant reduction in the high voltage and in the signal voltage available across the resistor 32. This reduction in the voltage across the resistor 32 will provide an increase in the bias condition between the control electrode 40 and the cathode 41 resulting in a reduction in the conduction of the overload signal amplifier tube thereby providing a positive going signal at the anode 45.

This positive going signal is applied to the control grid 50 of the AGC tube 52 thereby resulting in an increase in the slope of the AGC characteristic and consequent increase in the current flow through this tube thereby resulting in an increase in the AGC bias voltage available for biasing the signal translating portions of the system and accordingly reducing the amplifying ability of the signal translating stages. The reduction in the amplifying ability of the signal translating stages will, of course, result in a reduction in the amplitude of the signal information applied to the associated kinescope thereby reducing and eliminating the overload condition.

From the foregoing it is recognized that complete control of the operating voltages for a tri-color kinescope may be had in accordance with the circuitry of the present invention and in a manner requiring a minimum number of elements. Since the operation of the circuitry provided by the present invention is such as to effect the operation of the associated signal translating circuit only upon the presence of an overload condition, it is appreciated that the full capabilities of all signal translating circuits and of the kinescope and power supply may be utilized for all signal conditions other than those tending to provide a deleterious overload condition. Upon the presence of an overload condition, the circuitry operates such as to prevent a sustained overload condition, thereby preventing damage to the kinescope or to the high voltage supply circuit thereby maintaining an appropriate balance of operation under all signal conditions.

Having thus described the invention, what is claimed as new is:

1. In a television receiver, the combination of: an image display apparatus requiring a relatively low-voltage power supply potential and a high-voltage power supply potential adapted to produce visible images in response to an applied television signal and having a pair of signal input terminals to receive video signals representative of said television signal, the high-voltage power requirements of said apparatus being a continuous function of the scene brightness depicted by said television signal, said apparatus also having high-voltage input terminals requiring a high-voltage supply potential in excess of a given minimum value at a given maximum current level; a low voltage power supply operatively connected to said image display apparatus; a high-voltage power supply means having output terminals across which is developed a high-voltage output potential for said display apparatus, said output potential being in excess of said minimum value for current levels less than said maximum, said supply means including means imparting a regulation characteristic to said supply means such that said output voltage developed by said power supply falls substantially below said minimum value for supplied current levels in excess of said maximum; means operatively connecting said power supply output terminals to said display apparatus high-voltage input terminals to operatively apply said developed high-voltage potential to said image display apparatus; voltage divider means connected across said high-voltage power supply output terminals, said voltage divider means deriving a control potential which is a fractional part of the potential appearing across said high-voltage terminals; a source of television signals; signal translating means adapted to derive a video signal from said television signals, said signal translating means being operably coupled to said signal source and having output terminals across which is developed a video signal; means coupling said display apparatus signal input terminals to said signal translating means output terminals to operatively apply said video signal to said image display apparatus; means included in said signal translating means for controlling the gain thereof in response to an applied control potential; and means operatively connected between said voltage-divider means and said gain controlling means to control the gain of said translating means as a function of said control potential derived by said voltage divider.

2. In a television signal receiving system having an electron-beam reproducing means demanding beam current supply which is a function of the brightness of the images reproduced thereby, the combination of: high-voltage supply means coupled with said reproducing means for energizing said reproducing means; gain-controlled signal translating means coupled with said reproducing means for applying image signals to said reproducing means, said signal translating means having a terminal for receiving automatic gain control potentials thereby to control the gain of said translating means; automatic gain control potential developing means operatively coupled with said signal translating means to develop an automatic gain control potential the value of which changes in a predetermined direction upon an increase in received signal strength; high-voltage supply current-overload correction apparatus coupled with said high-voltage supply means comprising, means for producing an overload-correction control signal the magnitude of which is a continuous function of the magnitude of the output potential supplied by said high-voltage supply means; voltage-regulating means operably connected with said high-voltage means stabilizing the potential supplied by said high-voltage supply for values of beam current below a given maximum and thereafter allowing an unstabilized reduction in high voltage for greater beam current values than said maximum; means connecting said overload-correction control-signal-producing means to said automatic gain control potential-developing means thereby to modify said automatic gain control potential in such a sense as to change the value of said automatic gain control potential in said predetermined direction upon a decrease in the potential supplied by said high-voltage supply means; and means applying said modified automatic gain control potential to said automatic gain control potential receiving terminal thereby to control the gain of said image signal translating means as a function of both variations in received signal intensity and changes in said high voltage potential.

3. In television signal receiving system having an electron-beam reproducing means demanding beam current supply which is a function of the brightness of the images reproduced thereby, the combination of: high-voltage supply means coupled with said reproducing means for energizing said reproducing means; gain-controlled signal translating means coupled with said reproducing means for applying image signals to said reproducing means, said signal translating means having a terminal for receiving automatic gain control potentials thereby to control the gain of said translating means; automatic gain control potential developing means operatively coupled with said signal translating means to develop an automatic gain control potential the value of which is a function of received carrier amplitude, said function being graphically representable by a curve of varying slope, all portions of which have a slope of a value below a predetermined maximum; signal-responsive means connected in said automatic gain control means for changing the value of said maximum slope as a function of an applied control siganl; high-voltage supply current-overload correction apparatus coupled with said high-voltage supply means comprising, means for producing an overload-correction control signal the magnitude of which is a continuous function of the magnitude of the output potential supplied by said high-voltage supply means; voltage regulating means operably connected with said high-voltage means stabilizing the potential supplied by said high-voltage supply for values of beam current below a given maximum and thereafter allowing an unstabilized reduction in high voltage for greater beam current values than said maximum; means connecting said overload-correction control-signal-producing means to said automatic gain control slope-changing means in an electrical sense increasing the maximum value of said slope in response to a decrease in the value of said high voltage; and means coupling said automatic gain control potential developing means to said translating means automatic gain control potential receiving terminal to operatively apply said automatic gain control potential to said translating means to control the gain of said signal translating means as a function of both received carrier amplitude and changes in said high-voltage potential.

References Cited in the file of this patent

UNITED STATES PATENTS

| | | |
|---|---|---|
| 2,672,505 | Schwarz | Mar. 16, 1954 |
| 2,673,892 | Richman | Mar. 30, 1954 |

FOREIGN PATENTS

| | | |
|---|---|---|
| 109,608 | Australia | Feb. 1, 1940 |